Sept. 22, 1953 W. B. HERNDON ET AL 2,652,782
FLUID FLYWHEEL CONSTRUCTION
Filed May 3, 1949 2 Sheets-Sheet 1

Inventors
Walter B. Herndon,
Ralph F. Beck &
William L. Tuschak
By Spencer, Willits, Helmig & Baillio
Attorneys

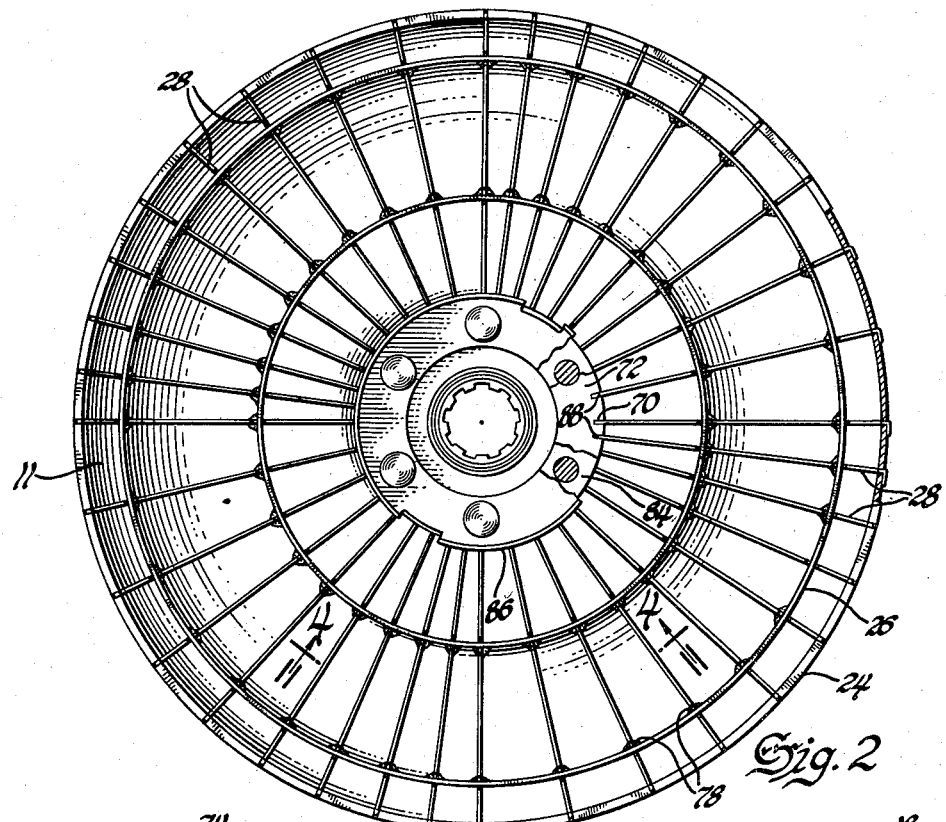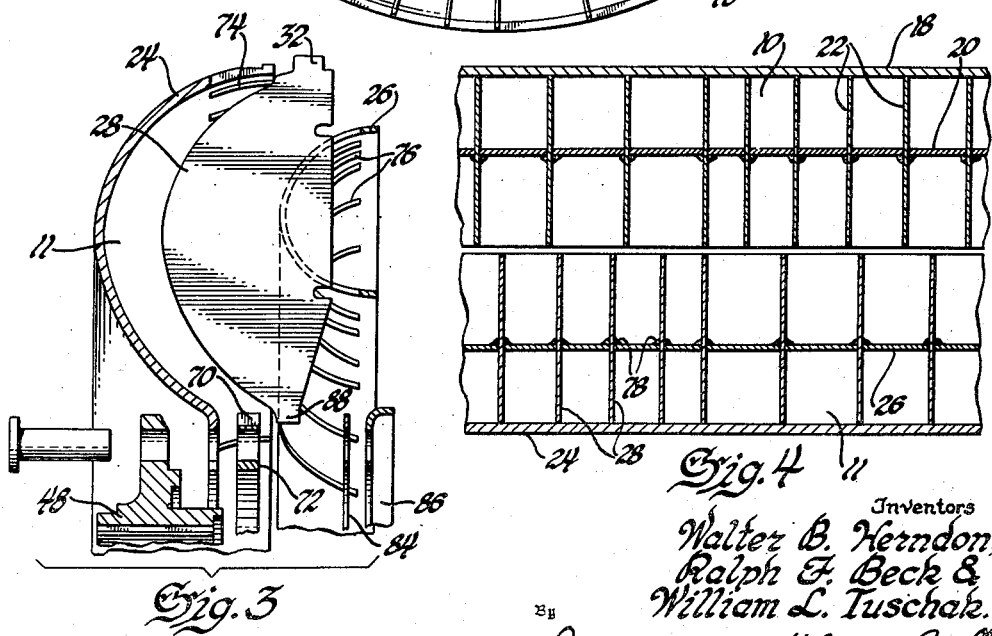

Patented Sept. 22, 1953

2,652,782

UNITED STATES PATENT OFFICE 2,652,782

FLUID FLYWHEEL CONSTRUCTION

Walter B. Herndon, Rochester, and Ralph F. Beck and William L. Tuschak, Detroit, Mich., assignors to General Motors Corporation, Detroit, Mich., a corporation of Delaware Application May 3, 1949, Serial No. 91,036

3 Claims. (Cl. 103—115)

The present invention relates to fluid coupling devices and more particularly to fluid coupling devices having radial vanes of the general type shown in U. S. Patent 2,357,295 Thompson.

Fluid couplings used in automobile transmissions are usually required to carry high torque, operate through an extreme range of speed, be quiet in operation and small in size. It is therefore necessary in the design of such transmissions to design them for compactness, weight, manufacturing convenience, trouble-free service and silent operation.

It is therefore an object of the present invention to provide a light weight fluid coupling of high torque capacity.

It is a further object of the present invention to provide extra capacity and reduce noise by extending the radial vanes into the eye of the torus of the coupling.

It is a further object of the present invention to provide greater capacity and reduce noise and increase the strength of a fluid coupling by providing a novel torus and vane assembly.

It is a still further object of the present invention to minimize resonant vibration by unequal angular spacing of the radial vanes.

It is a further object of the present invention to produce a fluid coupling which is simple to manufacture and efficient in operation.

Other objects of this invention will become apparent upon reading the specification and inspection of the drawings and will be particularly pointed out in the claims.

Referring to the figures in the drawings,

Figure 2 is a transverse view showing one-half of the fluid coupling.

Figure 3 is an exploded view showing the assembly of the blades.

Figure 4 is a sectional view taken along the lines 4—4 of Figure 2.

Figure 1:
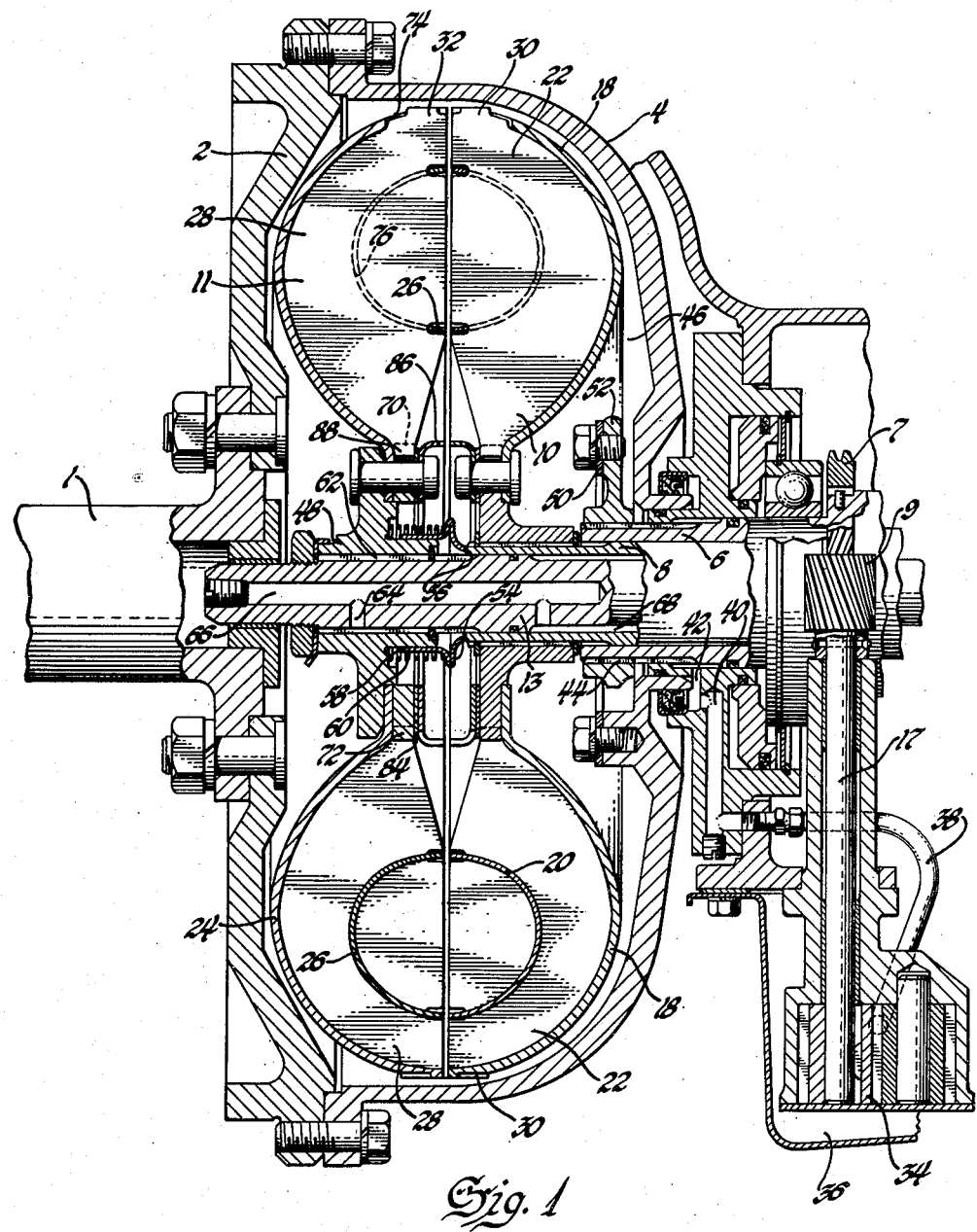
Figure 1 is a longitudinal sectional view through the fluid coupling and part of its associated mechanism.

Referring more particularly to Figure 1, an engine driven shaft 1 is bolted to a flywheel 2 which is in turn bolted to a housing member 4. This housing member is attached to the hollow shaft 6 through a ring 50 and element 52 which shaft is connected through a train of gears to a second hollow shaft 8. The hollow shaft 8 is attached to the pump section 10 of the coupling.

The pump section 10 of the coupling consists of an external semi-torus member 18 and an internal semi-torus member 20. These members are usually made of pressed steel for strength and light weight, but may be castings or forgings without departing from the scope of this invention. Vane members 22 extend radially through slots in the internal semi-torus member 20 to provide vanes both in the space between 18 and 20 and in the eye of the torus inside 20. These vanes are secured to member 20 by brazing and to member 18 by the use of tabs 30 as will be described later in the specification. The semi-torus member 10 is here illustrated as the driving member and similar semi-torus member 11 is illustrated as the driven member. The members 24, 26, 28 and 32 are identical to members 18, 20, 22 and 30 respectively. It may thus be seen that by combining these two semi-torus members a fluid coupling is formed having dual paths of fluid flow. The main coupling is obtained by the toroidal flow of fluid in the path between 18 and 20 and between 24 and 26 respectively. A second torque-transmitting means is provided by fluid within the eye of the main toroid, namely, in the space included between the members 20 and 26. The oil in this eye of the torus also provides a sound absorbing means to reduce vibration noise.

The output element 24 is connected to a collar member 48 as will be described later and this collar member is splined to the shaft 13 to transmit torque from this driven member. In the present instance the shaft 13 drives a change gear transmission of the planetary type.

In order to provide a maximum of torque-transmitting capacity and a minimum of cavitation with resulting turbulence and foaming, the hydraulic fluid within the coupling is maintained under static pressure. That is to say, the oil within the cavity included between the members 2 and 4 and including the hydraulic coupling, is maintained under pressure. Due to the centrifugal action of this system, the pressure at the outer periphery of the members is considerably greater than that near the axis of rotation. This pressure differential is a function of the angular velocity of the members. In order to provide positive pressure at all times, the oil is so circulated that it enters the hydraulic coupling at the outer edge thereof and is allowed to escape past a pressure valve 54 near the axis of rotation.

The oil under pressure is provided by gear pump 34 driven by shaft 6 through gears 7 and 9 and shaft 17. It is common practice to use a hydraulic fluid with lubrication properties for hydraulic couplings and to use this same fluid for lubricating an associated change gear transmission. Oil of this type is used in the present instance and the oil pan 36 of the transmission acts as a reservoir for the oil. Oil is forced under pressure from this reservoir 36 through oil line 38 and passages 40, 42 and 44 into the cavity 46 surrounding the hydraulic coupling members 10 and 11. The oil enters this coupling between the halves of the toroidal members at their outer periphery. The oil is maintained under pressure by the pressure release valve member 54 which is held against the end surface 56 of the shaft 8 by spring 60 to form a liquid tight seal. The member 54 has a slip fit on the exterior surface 58 of the member 48 which permits axial movement but provides a substantially fluid tight seal with this surface. The member 54, as will be noted, is biased into engagement with the surface 56 by means of coil spring 60. The cross section area of the line of engagement between the member 54 and the surface 56 is smaller than the cross sectional area of the diameter 58. The oil pressure within the fluid coupling acts on the differential between these two areas against the spring bias imposed by coil spring 60. In other words, the oil pressure inside the coupling near its axis of rotation times the difference between the cross section areas at these two diameters must exceed the bias imposed by the spring 60 for the valve to open and allow the escape of fluid. Under normal operating conditions the pressure inside the torus is maintained high enough to keep this valve partly open a large portion of the time and thus allow the escape of oil for lubrication purposes. The circulation of oil through the hydraulic coupling replenishes the hot oil in the coupling with cooler oil from the reservoir 36. The oil from the low pressure side of the valve 54 is allowed to escape through passages 62, 64, 66 and 68 and thence to the lubrication system of the change gear transmission.

Referring now more particularly to Figures 2, 3, and 4, the details of construction of the hydraulic coupling are illustrated. It will be noted from inspection of Figures 2 and 4 that the angular spacing of the vanes in the two halves of the torus are unequal. Each mating half of the torus has four quadrants of progressively wider spaced radial vanes. This unequal spacing minimizes resonant vibration which otherwise may be set up at blade passage frequency. These two torus halves are identical in construction as shown in Figure 4 and therefore a minimum of vanes 28 are aligned with vanes 22 at any particular instant. Since these two halves of the torus are identical, the construction of only one of these halves will be described in detail. The radially spaced vanes 28 extend through slots 74 in the member 24 and slots 76 in the member 26 to provide torque-transmitting means in both of the hydraulic circuits, one of which surrounds the member 24 and one of which is interior that member. These slots are just wide enough to permit easy assembling of the vanes to form the elements in the two hydraulic circuits. The half toroid is assembled as shown in Figure 3 with the vanes 28 maintained in position by tabs 32 being bent over as shown in Patent 2,357,295 Thompson and by the assembly of the members 48 with the slotted ring 72 and the retaining rings 84 and 86. The member 72 has slots 70 therein wide enough to permit the insertion of the projections 88 of the vane members 28. The interior semi-toroidal member 26 is then assembled with the vanes 28 fitting into slots 76. After this assembly is made, a brazing material is inserted along the edges 78 of the vanes 28 and the internal member 26. Heat is then applied to form a continuous brazed joint between the vanes 28 and the internal member 26.

It is to be understood also that although the invention has been described with specific reference to a particular embodiment thereof, it is not to be so limited, since changes and alterations therein may be made which are within the full intended scope of this invention as defined by the appended claims.

We claim:

1. A vaned dual flow path element for a hydraulic torque transmitting mechanism composed of an impeller and rotor assembly having a parting zone therebetween comprising; an outer semi-torus member, a plurality of spaced slots in said torus member extending from the parting zone portion of said torus rearwardly into said torus, an inner semi-torus member, a plurality of slots in said inner torus member extending therethrough from the rear portion thereof and terminating short of the parting zone to provide a continuous surface on said inner torus member adjacent the parting zone, an inner slotted ring, blade members carried by said torus members, each of said blade members having a portion thereof extending through the slots of said outer torus member and a tab adapted to engage the outer surface of said torus member, said blade members having a tab extending into the slots of said inner ring, said blade members having a portion thereof extending through the slots on said inner torus member, and recessed portions on one edge of said blades, said recessed portions of said blades cooperating with the continuous surface of said inner semi-torus member to permit said blades to extend to said parting zone in assembled relationship.

2. A vaned dual flow path element for a hydraulic torque transmitting fluid coupling composed of an impeller and rotor assembly having a parting zone therebetween comprising; an outer semi-torus member, a plurality of unequally spaced slots in said torus member, an inner semi-torus member, a plurality of unequally spaced slots in said inner torus member extending from the rear portion thereof and terminating short of the parting zone to provide a continuous surface on said inner torus member adjacent the parting zone, an inner ring having a plurality of unequally spaced slots thereon, blade members carried by said torus members and extending into the slots of the inner and outer torus members and the slots of said inner ring whereby said blades are held in unequally spaced relationship with respect to each other, and a pair of recessed portions on one edge of said blades, said blade recesses cooperating with the continuous surface of said inner semi-torus member whereby said blades extend through the inner semi-torus member to said parting zone in assembled relationship.

3. A dual flow path hydraulic torque transmitting assembly comprising an impeller and a rotor facing each other to form a fluid working chamber, a parting zone between said impeller and rotor, said impeller and rotor being of similar construction and each comprising an outer shell and an inner core ring for dividing said fluid working chamber into outer and inner fluid chambers, a plurality of slots in each of said outer shells, said slots extending from said parting zone into said shells to receive blades therein, a plurality of slots in each of said core rings extending from the surface thereof remote from said parting zone to a close proximity to said parting zone to provide a non-slotted portion adjacent said parting zone, an inner slotted retaining ring on each of said impellers and rotors, respectively, blade members positioned in said slots, said blade members having a portion thereof extending through the slots in said outer shell and a tab adapted to be bent over upon the outer surface of said outer shell, said blade members having an inner tab adapted to extend into the slotted inner retainer ring, and inwardly extending recesses on said blades cooperating with the non-slotted portion of said inner core ring to permit said blades to extend through said inner fluid working chamber and co-extensive with said parting zone in assembled relationship.

WALTER B. HERNDON.
RALPH F. BECK.
WILLIAM L. TUSCHAK.

References Cited in the file of this patent

UNITED STATES PATENTS

| Number | Name | Date |
| --- | --- | --- |
| 1,904,054 | Kiep et al. | Apr. 18, 1933 |
| 2,031,521 | Baumann | Feb. 18, 1936 |
| 2,336,231 | Dodge | Dec. 7, 1943 |
| 2,357,295 | Thompson | Sept. 5, 1944 |
| 2,362,341 | Baker | Nov. 7, 1944 |
| 2,365,354 | Pennington | Dec. 19, 1944 |
| 2,370,438 | Basebe | Feb. 27, 1945 |
| 2,382,960 | Compton et al. | Aug. 21, 1945 |
| 2,473,185 | Weiss | June 14, 1949 |
| 2,556,676 | Carnegie | June 12, 1951 |